US012542063B2

(12) United States Patent
Martin et al.

(10) Patent No.: US 12,542,063 B2
(45) Date of Patent: Feb. 3, 2026

(54) DEVICE AND METHOD FOR AUTOMATIC PROPOSAL OF AIR-CONFLICT RESOLUTION

(71) Applicant: THALES, Courbevoie (FR)

(72) Inventors: Nicolas Martin, Rungis (FR); Maxime Tessier, Rungis (FR); Isabelle Leblanc, Rungis (FR)

(73) Assignee: THALES, Courbevoie (FR)

( * ) Notice: Subject to any disclaimer, the term of this patent is extended or adjusted under 35 U.S.C. 154(b) by 777 days.

(21) Appl. No.: 17/787,327

(22) PCT Filed: Dec. 10, 2020

(86) PCT No.: PCT/EP2020/085588

§ 371 (c)(1),
(2) Date: Jun. 19, 2022

(87) PCT Pub. No.: WO2021/122324

PCT Pub. Date: Jun. 24, 2021

(65) Prior Publication Data

US 2023/0015165 A1 Jan. 19, 2023

(30) Foreign Application Priority Data

Dec. 19, 2019 (FR) ....................................... 1914794

(51) Int. Cl.
*G08G 5/34* (2025.01)
*G08G 5/20* (2025.01)
(Continued)

(52) U.S. Cl.
CPC ................. *G08G 5/34* (2025.01); *G08G 5/20* (2025.01); *G08G 5/30* (2025.01); *G08G 5/80* (2025.01)

(58) Field of Classification Search
CPC .. G08G 5/34; G08G 5/30; G08G 5/80; G08G 5/55; G08G 5/53; G08G 5/22
See application file for complete search history.

(56) References Cited

U.S. PATENT DOCUMENTS 8,744,649 B2 * 6/2014 Magana Casado ...... G08G 5/54 701/3
9,052,198 B2 * 6/2015 Louise-Babando ..... G06F 3/033
(Continued)

FOREIGN PATENT DOCUMENTS

FR 2 854 977 A1 11/2004
WO 2017/168423 A1 10/2017

OTHER PUBLICATIONS

Granger, et al., "Optimal Resolution of En Route Conflicts", Air Traffic Control Quarterly, vol. 3, No. 3, 1997.
(Continued)

*Primary Examiner* — David P. Merlino
*Assistant Examiner* — Mahmoud M Kazimi
(74) *Attorney, Agent, or Firm* — BakerHostetler

(57) ABSTRACT

A method for automatically proposing an air conflict resolution, the method includes a step of receiving air conflict and air situation data at a time when an air conflict is detected, the method comprising the steps of: determining a conflict category associated with the detected air conflict based on the conflict data; determining a degree of relevance in proposing a resolution to the air conflict according to the category and the air situation; determining one or more types of resolution to be applied to resolve the detected air conflict according to the degree of relevance; determining set of alternative trajectories corresponding to the one or more types of resolution; determining a set of candidate trajectories from among the set of alternative trajectories, a candidate trajectory being an alternative trajectory which does not generate an air conflict; selecting, from among the candidate
(Continued)

trajectories, a candidate trajectory which fulfills a selection criterion relating to the operational relevance of the candidate trajectories and to the acceptability of the candidate trajectories by the flight plan management system; returning the candidate trajectory, the candidate trajectory being saved and re-evaluated as long as it does not generate an air conflict or has not been accepted by an air traffic controller.

10 Claims, 2 Drawing Sheets

(51) Int. Cl.

| | |
|---|---|
| ***G08G 5/30*** | (2025.01) |
| ***G08G 5/80*** | (2025.01) |

(56) References Cited

U.S. PATENT DOCUMENTS

| | | | | |
|---|---|---|---|---|
| 9,053,634 | B2 | 6/2015 | Vilaplana et al. | |
| 9,858,825 | B2 * | 1/2018 | Vilaplana | G08G 5/80 |
| 12,242,265 | B2 * | 3/2025 | Campise | G05D 1/226 |
| 2005/0156777 | A1 * | 7/2005 | King | G08G 5/53 342/29 |
| 2008/0033648 | A1 | 2/2008 | Kelly et al. | |
| 2012/0116614 | A1 * | 5/2012 | Torres | G08G 5/727 701/3 |
| 2012/0303253 | A1 * | 11/2012 | Irfan | G08G 5/727 701/120 |

OTHER PUBLICATIONS

Bilimoria, "A Geometric Optimization Approach to Aircraft Conflict Resolution", AIAA paper 2000-4625, Aug. 2000.
Gosh, et al., "Maneuver design for multiple aircraft conflict resolution", American Control Conference, 2000.
Durand, et al., "Neural nets trained by genetic algorithms for collision avoidance", Applied Intelligence, 13(3), 2000.
Frazzoli, "Aircraft conflict resolution via semidefinite programming", AIAA Journal of Guidance, Control and Dynamics, vol. 24, No. 1, 2001.
Pallottino, et al., "Conflict resolution problems for air traffic management systems solved with mixed integer programming", IEEE Transactions on Intelligent Transportation Systems, vol. 3, No. 1, 2002.
Paielli, "Modeling Maneuver Dynamics in Air Traffic Conflict Resolution", Journal of Guidance, Control, and Dynamics, vol. 26, No. 3, pp. 407-415, 2003.
Durand, "Genetic algorithms and other optimization methods applied to air traffic management", Hyper Articles en Ligne, 2004 (abstract).
Erzberger, "Automated conflict resolution for air traffic control", Proceeding International Congress Aeronautical Sciences, pp. 1-27, 2006.
Granger, "D'etection et r'esolution de conflits a'eriens : mod'elisations et analyse/Detection and resolution of air conflicts: modeling and analysis", Part III, Reconflict resolution, pp. 71-127, Oct. 28, 2022.
Erzberger, "Automated Conflict Resolution For Air Traffic Control", (NASA Ames Research Center Moffett Field, CA, United States), Jan. 1, 2005.

* cited by examiner

DEVICE AND METHOD FOR AUTOMATIC PROPOSAL OF AIR-CONFLICT RESOLUTION

CROSS-REFERENCE TO RELATED APPLICATIONS

This application is a National Stage of International patent application PCT/EP2020/085588, filed on Dec. 10, 2020, which claims priority to foreign French patent application No. FR 1914794, filed on Dec. 19, 2019, the disclosures of which are incorporated by reference in their entirety.

FIELD OF THE INVENTION

The invention relates in general to air navigation control systems, and in particular to the resolution of air conflicts.

BACKGROUND

One of the roles of air navigation control systems (also called air traffic control systems) is to prevent collisions between aircraft while maintaining a steady flow of air traffic.

Collision prevention is an essential role of air navigation control systems. Collision prevention is conventionally ensured by defining minimum distances and separation times between aircraft, as defined in the standards. A conflict is detected when two aircraft have trajectories that are expected to violate minimum separations. One of the main missions of air traffic controllers is to resolve these conflicts so that separation between aircraft, and safety, is always ensured.

Currently, the controllers themselves look for ways to resolve conflicts between aircraft. They are aided by a number of tools, mainly human-machine interfaces (HMI), with limited functions. With the increase in air traffic and its complexity, the detection and resolution of air conflicts is becoming increasingly difficult, and the choice of resolution strategies to adopt is becoming more complex. In addition, the controller's workload is significantly increased, which has a direct impact on the capacity and safety of the airspace.

There are various approaches to air conflict resolution including the approaches described in:

"Durand, N; Alliot, J.; and Chansou, O.: Optimal Resolution of En Route Conflicts, Air Traffic Control Quarterly, vol. 3, no. 3, 1995".

"Bilimoria, Karl: A Geometric Optimization Approach to Aircraft Conflict Resolution, AIAA paper 2000-4625, August 2000".

"R. Gosh and C. Tomlin., Maneuver design for multiple aircraft conflict resolution, In American Control Conference, 2000".

"N. Durand, J. M. Alliot, and F. Medioni, Neural nets trained by genetic algorithms for collision avoidance. Applied Intelligence, 13(3): 205-213, 2000".

"E. Frazzoli, Z. H. Mao, and E. Feron, Aircraft conflict resolution via semidefinite programming. AIAA Journal of Guidance, Control and Dynamics, 2001".

"Granger G., Detection and resolution of air conflicts: modeling and analysis, 2002".

"L. Pallottino, E. Feron, and A. Bicchi, Conflict resolution problems for air traffic management systems solved with mixed integer programming. IEEE Transactions on Intelligent Transportation Systems, 3(1):3-11, 2002".

"Russell A. Paielli, Modeling Maneuver Dynamics in Air Traffic Conflict Resolution, Journal of Guidance, Control, and Dynamics, vol. 26, no. 3, May-June 2003, pp. 407-415".

"Durand N., Genetic algorithms and other optimization methods applied to air traffic management, 2004".

"H. Erzberger, Automated conflict resolution for air traffic control, in Proceeding International Congress Aeronautical Sciences, pp. 1-27, 2006".

"M. A. Vilaplana, E. Valls, F. Garcia de Blanes, I. del Pozo de Poza Conflict detection and resolution using predicted aircraft trajectories, 2012".

The existing approaches allow an air conflict to be resolved in the form of a constrained optimization problem. Conflict resolution is performed by the air traffic controller, using a few largely unautomated tools that allow them to display planned aircraft trajectories, measure the distance between the trajectories and visualize the point where the distance between the aircraft will be minimal, indicating a potential conflict. When the controller has an automatic medium-term conflict detection tool, they can also visualize the conflict zone and obtain additional information on the conflict. They can also, before applying a solution to resolve the detected conflict, test this solution in the system to check that it actually resolves the conflict and that it does not create other conflicts. However, the tasks of analyzing the air situation and determining a solution that resolves the detected conflict are always carried out manually by the air traffic controller. These are complex tasks which take up a large portion of the workload of the controller's functions. The increase in air traffic requires new tools to lighten this load, in order to allow efficient airspace management in complete safety.

Other solutions presented in different fields may provide inspiration, such as the solution disclosed in patent US2008/033648 which deals with a collision avoidance method for two ships at sea optimized according to nautical characteristics.

In addition, the current air conflict resolution solutions do not allow a single resolution proposal to be isolated and the controller must assess each proposal and estimate which is the most relevant. However, in low-traffic airspace, a great number of proposals may be of no use because that slows down the controller's analysis, while in high-traffic airspace, analyzing each proposal takes too much time. Moreover, if proposals are not continuously re-evaluated, there is a risk, when the air traffic controller accepts the proposal, of system rejection or of the appearance of new conflicts. Other existing solutions do not allow operational implementation because the sequence of orders to be given is difficult for the controller to follow or cannot be given with current radio communication means.

There is therefore a need for an improved method and device for managing the resolution of air traffic conflicts.

SUMMARY OF THE INVENTION

The invention aims to improve the situation. To that end, the invention proposes a method for automatically proposing an air conflict resolution. The method comprises a step of receiving air conflict and air situation data at a time when an air conflict is detected, the method comprising the steps of:

determining a conflict category associated with the detected air conflict based on the conflict data;

determining a degree of relevance in proposing a resolution to the air conflict according to the category and the air situation;

determining one or more types of resolution to be applied to resolve said detected air conflict according to said degree of relevance;

determining a set of alternative trajectories corresponding to the one or more types of resolution;

determining a set of candidate trajectories from among the set of alternative trajectories, a candidate trajectory being an alternative trajectory which does not generate an air conflict;

selecting, from among the candidate trajectories, a candidate trajectory which fulfills a selection criterion relating to the operational relevance of the candidate trajectories and to the acceptability of the candidate trajectories by the flight plan management system, the selecting step comprising the sub-steps of associating a degree of operational relevance with each candidate trajectory according to a number of operational relevance criteria, classifying the candidate trajectories in order of operational relevance as a function of the degrees of relevance associated with said trajectories, and selecting, from among the candidate trajectories classified in order of operational relevance, the most relevant candidate trajectory which is accepted by the flight plan management system and which allows the resolution of the air conflict without generating other air conflicts;

returning the candidate trajectory, said candidate trajectory being saved and re-evaluated as long as it does not generate an air conflict or has not been accepted by an air traffic controller.

According to some embodiments, a type of resolution may correspond to one or more conflict resolution actions, a conflict resolution action being chosen from a group comprising a change in trajectory, a change in flight level, and a change in speed.

According to some embodiments, a type of resolution may correspond to one or more constraints relating to the one or more conflict resolution actions, a constraint being chosen from a group comprising a constraint relating to the orientation and to maximum values for the change of route, a constraint relating to a minimum or maximum flight level value, and a constraint relating to a minimum or maximum speed value.

According to some embodiments, the conflict category may depend on at least one criterion chosen from a group comprising the geometry of the air conflict, the proximity of the air conflict, the criticality of the air conflict, and the evolutionary aspect of the flights.

According to some embodiments, the number of criteria may comprise flight efficiency, flight efficiency being defined by a plurality of criteria comprising fuel consumption, effect on comfort on board the aircraft, fairness between the aircraft involved in the air conflict, and the complexity in implementing and following the proposed solution.

According to some embodiments, the air conflict data may comprise the geometry of the conflict, the proximity of the conflict, the criticality of the conflict, and the evolutionary aspect of the flights.

According to some embodiments, the method may comprise a step of returning the flights relating to those solutions which are more optimal than the solution which was returned and which have not been returned.

The invention further provides a device for automatically proposing an air conflict resolution, the device being configured to receive air conflict and air situation data at a time when an air conflict is detected. The device comprises a resolution proposal unit configured to:

determine a conflict category associated with the detected air conflict based on the conflict data;

determine a degree of relevance in proposing a resolution to the air conflict according to the category and the air situation;

the device further comprising a resolution search unit configured to:

determine one or more types of resolution to be applied to resolve the detected air conflict according to the degree of relevance;

determine a set of alternative trajectories corresponding to the one or more types of resolution;

determine a set of candidate trajectories from among the set of alternative trajectories, a candidate trajectory being an alternative trajectory which does not generate an air conflict;

select, from among the candidate trajectories, a candidate trajectory which fulfills a selection criterion relating to the operational relevance of the candidate trajectories and to the acceptability of the candidate trajectories by the flight plan management system, the resolution search unit being configured to associate a degree of operational relevance with each candidate trajectory according to a number of operational relevance criteria, classify the candidate trajectories in order of operational relevance as a function of the degrees of relevance associated with said trajectories, and select, from among the candidate trajectories classified in order of operational relevance, the most relevant candidate trajectory which is accepted by the flight plan management system and which allows the resolution of said air conflict without generating other air conflicts;

return the candidate trajectory, said candidate trajectory being saved and re-evaluated as long as it does not generate an air conflict or has not been accepted by an air traffic controller.

Advantageously, the embodiments of the invention allow automated management of the air conflict resolution proposal.

Advantageously, the embodiments of the invention make it possible to automatically provide air traffic controllers with solutions that ensure the resolution of detected air conflicts without creating new conflicts within a parameterizable time horizon, the solutions being reliable, relevant, and operationally acceptable.

Advantageously, the automatic proposal of air conflict resolutions according to the embodiments of the invention makes it possible to lighten the workload of air traffic controllers while respecting the strategies traditionally adopted by air traffic controllers. The conflict resolution solutions proposed automatically are reliable and operationally relevant.

Advantageously, the air conflict resolution solutions according to the embodiments of the invention are based on an overall resolution and an evaluation of the proposed resolution with regard to the entire air situation, as opposed to a local resolution which takes into account the aircraft involved in the detected conflict or a set of aircraft, thereby providing better stability and an improvement in air traffic.

Advantageously, the embodiments of the invention provide strategies for determining the categories of conflicts and the air situation as well as sorting and selecting the solution to be applied to resolve air conflicts which take into account onboard effects and operational constraints.

Advantageously, the embodiments of the invention provide a single and optimal solution to be applied to resolve an air conflict.

Advantageously, the embodiments of the invention make it possible to increase the safety and capacity of the airspace.

BRIEF DESCRIPTION OF THE DRAWINGS

Other features, details and advantages of the invention will become apparent from reading the description, which is given with reference to the appended drawings, which are given by way of example and in which, respectively.

DETAILED DESCRIPTION

The embodiments of the invention may be used in air traffic control systems for providing decision assistance to air traffic controllers, in order to resolve air conflicts, prevent collisions between aircraft or between aircraft and given zones (for example segregation zones, prohibited zones or restricted zones), and to manage the flow of air traffic.

According to the embodiments of the invention, an aircraft may be any type of aircraft, such as an airplane, a helicopter, a hot-air balloon, or a drone.

Such as used here, a flight plan of an aircraft is a sequence of waypoints in four-dimensional space comprising a latitude, a longitude, an altitude, and a time value (or 'estimated time of overflight'). The waypoints represent the path to be followed by the aircraft at the times indicated by the time values.

As used here, a clearance corresponds to an authorization and/or a constraint given by the air traffic controller to execute a phase of the flight plan.

According to some embodiments, a clearance may be chosen from a group comprising heading changes, direct forward orders, parallel start orders, speed change orders, and flight level change orders.

Figure 1:
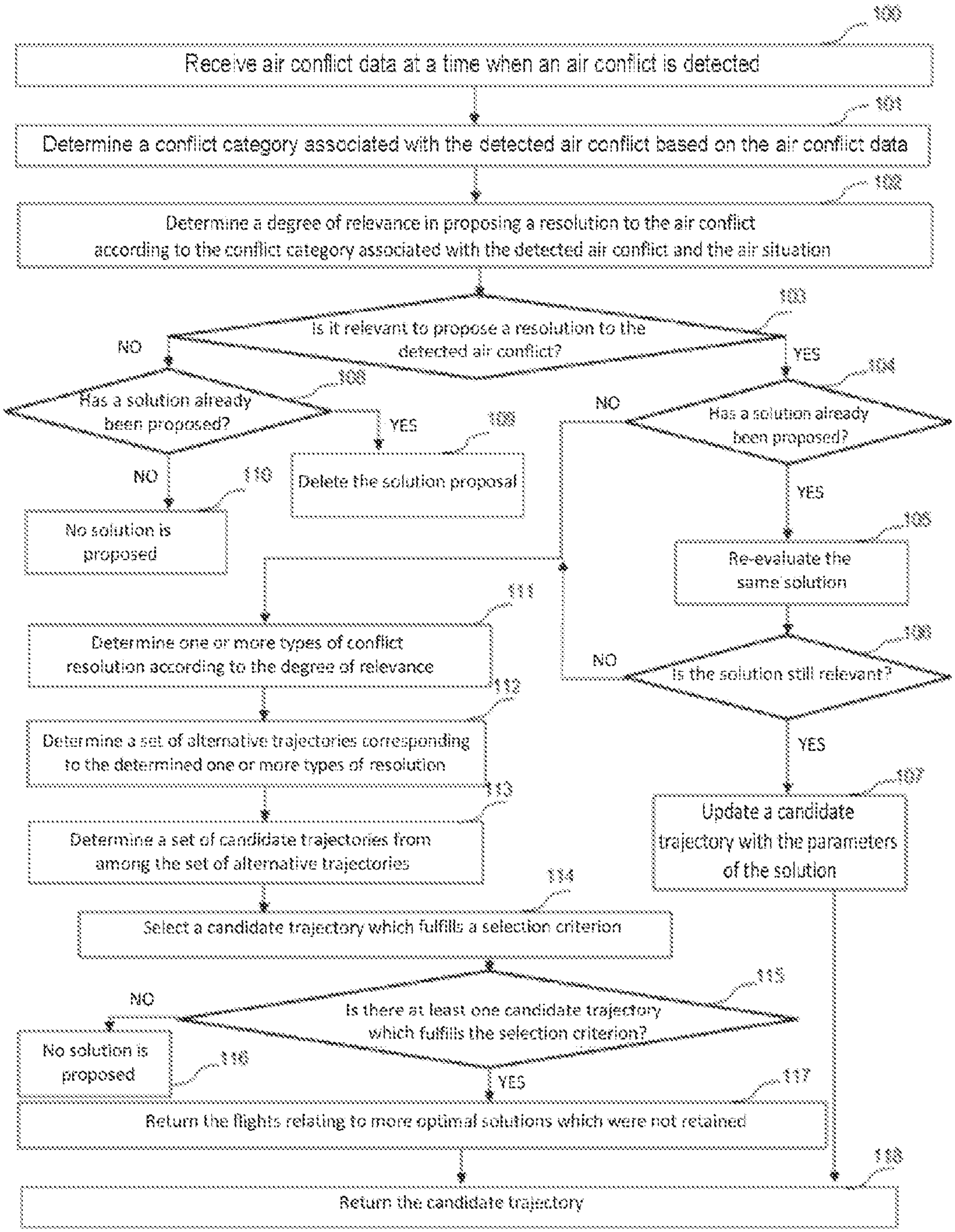
FIG. 1 shows a flowchart representing a method for automatically proposing an air conflict resolution according to some embodiments of the invention.

With reference to FIG. 1, the embodiments of the invention provide a method for automatically proposing an air conflict resolution, the air conflict being represented by air conflict data.

In step 100, the air conflict and air situation data at a time when an air conflict is detected (between at least two aircraft or between an aircraft and a given zone) may be received.

According to some embodiments, the air conflict data may comprise the geometry of the air conflict, the proximity of the air conflict, the criticality of the air conflict, and the evolutionary aspect of the flights.

In step 101, a conflict category associated with the detected air conflict may be determined based on the air conflict data.

According to some embodiments, the air conflict category may depend on at least one criterion chosen from a group comprising the geometry of the air conflict, the proximity of the air conflict, the criticality of the air conflict, and the evolutionary aspect of the flights.

In step 102, a degree of relevance in proposing a resolution to the air conflict may be determined according to the category of the detected air conflict and the air situation. The degree of relevance makes it possible to determine whether it is relevant to propose a resolution to the air conflict given the air situation at the time when the air conflict is detected and the air conflict data.

In step 103, it is determined whether it is relevant to propose a resolution to the detected air conflict according to the degree of relevance determined in step 102. For example, in step 103, the degree of relevance associated with the detected conflict may be compared with a threshold value, the decision in step 103 corresponding to a relevance in proposing a resolution to the air conflict if the degree of relevance associated with the air conflict is greater than or equal to the threshold value.

If it is determined in step 103 that it is not relevant to propose a resolution to the detected air conflict, steps 108 to 109 may be carried out. In step 108, it is determined whether a solution for resolving the air conflict has already been proposed. If it is determined in step 108 that a solution has been proposed, the solution that has been proposed may be deleted in step 109. If it is determined in step 108 that no solution has been proposed, no solution for resolving the conflict is proposed in step 110.

If it is determined in step 103 that it is relevant to propose a resolution to the detected air conflict, step 104 may be carried out to determine whether an existing solution has already been proposed to resolve the air conflict. If it is determined in step 104 that no solution has been proposed (a solution that is already saved), steps 111 to 118 may be carried out to propose a solution for resolving the conflict. If it is determined in step 106 that a solution has already been proposed, the solution may be re-evaluated in step 105. If it is determined in step 106 following the re-evaluation of the solution that the solution is still relevant, a candidate trajectory may be updated with the parameters of the re-evaluated solution in step 107 and the updated candidate trajectory may be returned in step 118. If it is determined in step 106 that the solution that has been proposed is no longer relevant, steps 111 to 118 may be carried out.

Step 111 may be carried out to determine one or more types of conflict resolution to be applied to resolve the air conflict according to the degree of relevance. The type of resolution corresponds to the type of clearance to be given.

According to some embodiments, a type of resolution may correspond to one or more conflict resolution actions, a conflict resolution action being chosen from a group comprising a change in trajectory, a change in flight level, and a change in speed.

According to some embodiments, a type of resolution may further correspond to one or more constraints relating to one or more conflict resolution actions, a constraint being chosen from a group comprising a constraint relating to the orientation (left or right) and to maximum values for the change of route, a constraint relating to a minimum or maximum flight level value, and a constraint relating to a minimum or maximum speed value.

In step 112, a set of alternative trajectories corresponding to the one or more types of resolution to be applied may be determined, the alternative trajectories corresponding to trajectories for the flights in conflict.

In step 113, a set of candidate trajectories may be determined from among the set of alternative trajectories, a candidate trajectory being an alternative trajectory which does not generate an air conflict. Step 111 thus consists in determining, from among the alternative trajectories, those trajectories which allow the air conflict to be resolved without creating other conflicts. The proposed resolution is based on the candidate trajectories.

If it is determined in step 113 that the set of candidate trajectories comprises at least one candidate trajectory, a candidate trajectory which fulfills a selection criterion may be selected, in step 114, from among the at least one candidate trajectory determined in step 113. In step 115, it may be determined whether there is at least one candidate trajectory which fulfills the selection criterion. If it is determined in step 115 that the set of candidate trajectories does not comprise any candidate trajectory which fulfills the selection criterion, no solution is proposed in step 116. If it is determined in step 115 that the set of candidate trajectories comprises at least one candidate trajectory which meets the selection criterion, the candidate trajectory which meets the selection criterion may be returned in step 118 as the proposed solution and displayed to the air traffic controller as the resolution to the air conflict.

According to some embodiments, the selection criterion may relate to the operational relevance of the candidate trajectories and to the acceptability of the candidate trajectories by the flight plan management system. Thus, according to some embodiments, step 114 may comprise the sub-steps of:

associating a degree of operational relevance with each candidate trajectory according to a number of operational relevance criteria;

classifying the candidate trajectories in order of operational relevance according to the degrees of operational relevance associated with the candidate trajectories;

selecting, from among the candidate trajectories classed in order of operational relevance, the most relevant candidate trajectory which is accepted by the flight plan management system and which allows the air conflict to be resolved without generating other air conflicts.

Thus, if the set of alternative trajectories does not comprise any trajectory which resolves the air conflict without creating at least one other air conflict, no solution is proposed as the resolution to the detected conflict. However, if the set of alternative trajectories comprises multiple candidate trajectories, the sub-steps of step 114 make it possible to select, from among the candidate trajectories, the first trajectory which is accepted by the flight plan management system, which resolves the existing conflict on the initial trajectories of the flights in conflict without creating new air conflicts, and which is the most relevant from the point of view of operational relevance. The solution thus proposed to the air traffic controller to resolve the detected air conflict is unique, optimal, reliable, and operationally relevant.

According to some embodiments, the number of criteria may comprise flight efficiency, flight efficiency being defined by a plurality of criteria comprising, in a non-limiting manner, fuel consumption, effect on comfort on board the aircraft, fairness between the aircraft involved in the air conflict, and the complexity in implementing and following the proposed solution.

According to some embodiments, a solution may consist in modifying the trajectory of at least one of the aircraft to resolve the detected conflict. A solution seeking to modify the trajectory of an aircraft may be a "bearing"-type solution, a "direct"-type solution, or a "parallel"-type solution.

For bearing-type solutions, a solution tree may be constructed based on a number of user parameters, a solution being composed of a first point from which the planned route is left, a second point outside the original route which is defined along a rhumb line from the first point, and a third point at which the route is rejoined. For each first point, the set of three possible points may be evaluated according to at least one criterion.

For direct-type solutions, a solution tree may be constructed based on a number of user parameters, a solution being composed of a first point (called the "leaving point") which corresponds to the point from which the planned route is left, and a second point which corresponds to the point at which the route is rejoined.

According to some embodiments, a solution may consist in modifying the flight level of at least one of the aircraft to resolve the detected conflict.

According to some embodiments, a solution may consist in accelerating or slowing down at least one of the aircraft to resolve the air conflict.

According to some embodiments, the possible solutions may be sorted according to a criterion relating to the type of order given, to the air situation (vertical evolution in the flight plans, type of conflict, time to conflict), to the operational impact of the solution (impact on fuel consumption, impact on comfort on board the aircraft, complexity in implementing and following the solution, fairness between the aircraft involved in the air conflict), and the impact of the solution on the efficiency of the route (in terms of distance and time).

According to some embodiments, the proposed solution may be kept (saved) and re-evaluated each time the surrounding air situation changes, the solution being deleted and an alternative solution being sought if a conflict is resolved or if the proposed solution is no longer applicable.

According to some embodiments, the list of flights involved in the choice of the final solution may be displayed to the air traffic controller.

According to some embodiments, the flights and the zones involved in the conflicts found in relation to those solutions which are more optimal than the retained solution which were not retained may be returned to the air traffic controller in step 117.

According to some embodiments, the detection of an air conflict and/or the validation of the determined solutions may take into account prohibited zones.

According to some embodiments, the detection of an air conflict and/or the validation of the determined solutions may also take into account the meteorological impacts and/or coordination constraints put in place.

According to some embodiments, the selection of a solution may take into account the required performance of the routes and the possible performance of the aircraft.

According to some embodiments, the selection of a solution may take into account the impacts on airport arrival sequences.

Figure 2:
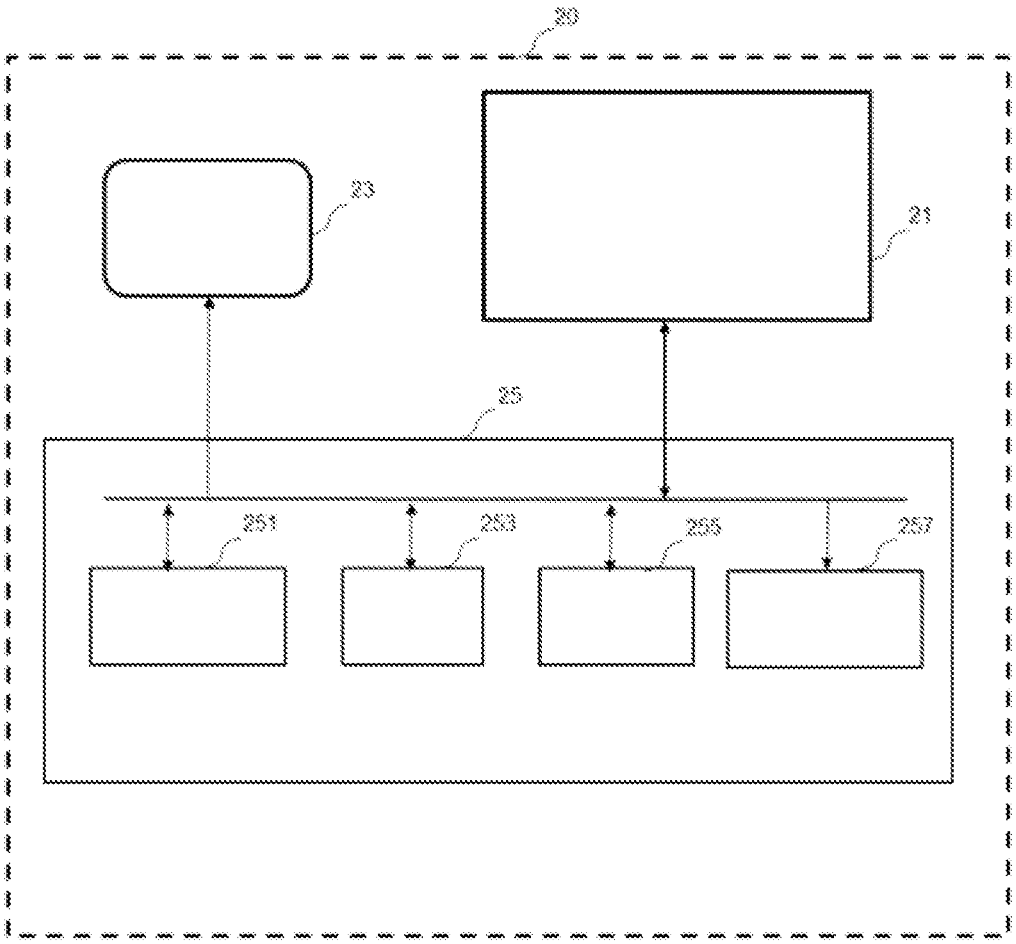
FIG. 2 shows a diagram representing an air traffic control system comprising a device for automatically proposing an air conflict resolution according to some embodiments of the invention.

With reference to FIG. 2, the embodiments of the invention further provide a device 25 for automatically proposing an air conflict resolution implemented in an air traffic control system 20, the device 25 comprising an air conflict detection unit 251 configured to detect air conflicts between at least two aircraft or between an aircraft and a given zone, the given zone possibly being a prohibited zone, a segregation zone, or a restricted zone. An air conflict may be a medium-term conflict (timescale under 40 minutes) or a long-term conflict (timescale under two hours).

In some embodiments, the device 25 may be configured to receive air conflict and air situation data at a time when an air conflict is detected.

According to some embodiments, the air conflict data may comprise the geometry of the air conflict, the proximity of the air conflict, the criticality of the air conflict, and the evolutionary aspect of the flights.

According to some embodiments, the air traffic control system 20 may comprise a processing unit 21 (referred to as a "flight data plan system") configured to manage the life cycle of the air traffic control system based on the flight plans associated with the aircraft operating in a controlled airspace. The processing unit 21 may be configured to determine a prediction for the trajectories including an estimate of the overflight times for points on the route, and to assign control of each flight to a controller according to the sectorization of the controlled airspace.

According to some embodiments, the processing unit 21 may further be configured to respond to probe requests to determine a trajectory for a given clearance, and to determine probe flight plans when a solution for resolving a detected conflict is shared between the units of the device 25.

According to some embodiments, the device 25 may comprise a resolution proposal unit 255 configured to determine a conflict category associated with the detected air conflict based on the air conflict data.

According to some embodiments, the air conflict category may depend on at least one criterion chosen from a group comprising the geometry of the air conflict, the proximity of the air conflict, the criticality of the air conflict, and the evolutionary aspect of the flights.

The resolution proposal unit 255 may further be configured to determine a degree of relevance in proposing a resolution to the air conflict according to the category and the air situation at the time when the air conflict is detected. The degree of relevance makes it possible to determine whether it is relevant to propose a resolution to the air conflict given the air situation at the time when the air conflict is detected and the air conflict data. The resolution proposal unit 255 thus allows the search for a solution to be triggered if the detected conflict is considered to be critical, for example if the separation between two aircraft involved in the detected conflict is below a minimum separation value. The resolution proposal unit 255 may be configured to trigger the search for a proposal as the resolution to the detected air conflict, for example if the degree of relevance associated with the air conflict is higher than or equal to a threshold value. If the resolution proposal unit 255 determines that it is not relevant to propose a resolution, no solution is proposed to the air traffic controller as the resolution to the conflict. If the resolution proposal unit 255 determines that it is not relevant to propose a solution as the resolution to the detected conflict, the resolution proposal unit 255 may be configured to determine whether a solution has already been proposed: if a solution has already been proposed, then the resolution proposal unit 255 may be configured to delete the solution proposal; otherwise, no solution is proposed.

If the resolution proposal unit 255 determines that it is relevant to propose a resolution to the air conflict, the resolution proposal unit 255 may be configured to check whether a solution has already been proposed as the resolution to the air conflict before triggering the search for a solution. If the resolution proposal unit 255 determines that a solution has already been proposed, that solution may be re-evaluated. If the resolution proposal unit 255 determines, following the re-evaluation of the solution, that the solution is no longer relevant, the resolution proposal unit 255 triggers the search for a solution; otherwise, a candidate trajectory may be updated with the parameters of the solution that has been proposed and the updated candidate trajectory may be returned as the solution to be applied to resolve the detected air conflict.

According to some embodiments, the device 25 may further comprise a resolution search unit 257 configured to determine one or more types of resolution to be applied to resolve the detected air conflict according to the degree of relevance; in particular, if the resolution proposal unit 255 determines that it is relevant to propose a resolution to the detected air conflict and that no solution has been proposed or that the solutions which have been proposed are no longer relevant. A type of resolution corresponds to the type of clearance to be given.

According to some embodiments, a type of resolution may correspond to one or more conflict resolution actions, a conflict resolution action being chosen from a group comprising a change in trajectory, a change in flight level, and a change in speed.

According to some embodiments, a type of resolution may further correspond to one or more constraints relating to one or more conflict resolution actions, a constraint being chosen from a group comprising a constraint relating to the orientation (left or right) and to maximum values for the change of route, a constraint relating to a minimum or maximum flight level value, and a constraint relating to a minimum or maximum speed value.

According to some embodiments, the resolution search unit 257 may further be configured to:

determine a set of alternative trajectories corresponding to the one or more types of resolution to be applied, the alternative trajectories corresponding to trajectories for the flights in conflict;

determine a set of candidate trajectories from among the set of alternative trajectories, a candidate trajectory being an alternative trajectory which does not generate an air conflict;

select, from among the candidate trajectories, a candidate trajectory which fulfills a selection criterion, and return the selected candidate trajectory.

The candidate trajectories are trajectories which allow the detected air conflict to be resolved without creating other conflicts. The proposed resolution is based on the candidate trajectories. Thus, if the resolution search unit 257 determines that the set of alternative trajectories does not comprise any candidate trajectories, no solution is proposed. And if the resolution search unit 257 determines that the set of alternative trajectories comprises at least one candidate trajectory, the resolution search unit 257 may be configured to select, from among the set of candidate trajectories, one trajectory according to a selection criterion.

According to some embodiments, the selection criterion may relate to the operational relevance of the candidate trajectories and to the acceptability of the candidate trajectories by the flight plan management system. Thus, according to some embodiments, the resolution search unit 257 may be configured to:

associate a degree of operational relevance with each candidate trajectory according to a number of operational relevance criteria, comprising, for example, the efficiency of the flight;

classify the candidate trajectories in order of operational relevance according to the degrees of operational relevance associated with the candidate trajectories;

select, from among the candidate trajectories classed in order of operational relevance, the most relevant candidate trajectory which is accepted by the flight plan management system and which allows the air conflict to be resolved without generating other air conflicts.

According to some embodiments, the resolution search unit 257 may be configured to determine the validity period for each determined solution, in addition to the controller order to be given to the pilot to resolve the air conflict. Within the validity period for a solution, re-evaluation of the solution is not necessary. The resolution search unit 257 may further be configured to determine parameters relating to each solution comprising the aircraft which are not involved in the detected conflict but which have prevented the use of a more relevant solution, the efficiency of the solution (for example in terms of time and distance that it saves or adds with respect to the nominal trajectory), and the impact of the solution on the overall air situation.

According to some embodiments, the resolution proposal unit 255 may be configured to consolidate the results from the resolution search unit 257 and direct the choices of the resolution search unit 257 according to the air situation of the detected conflict.

According to some embodiments, the device 25 may further comprise a detection unit 253 configured to detect air conflicts if at least one of the flights in conflict is a probe. The detection unit 253 may also be configured to check the validity of the solutions proposed by the resolution search unit 257. In particular, when a solution is proposed by the resolution search unit 257, the detection unit 253 may be configured to associate a probe flight plan with the proposed solution and resolve a conflict causing the solution to be invalid if the air situation changes and this flight plan loses its separation.

The air traffic control system 20 may further comprise a human-machine interface 23 configured to represent the air situation to the controller of the air traffic control system 20, display the filed flight plans and their trajectory predictions, display the current position of the runways and the conflicts detected by the device 25 as well as the proposed solutions to resolve the detected conflicts.

The invention further provides a computer program product comprising code instructions making it possible to perform the steps of the method when said program is executed on a computer.

The embodiments of the invention may be implemented by various means, for example by hardware, software, or a combination thereof.

In general, the routines executed to implement the embodiments of the invention, whether they are implemented in the context of an operating system or a specific application, a component, a program, an object, a module or a sequence of instructions, or even a subset thereof, may be referred to here as “computer program code” or just “program code”. The program code typically comprises computer-readable instructions which reside at various times in various memory and storage devices in a computer and which, when they are read and executed by one or more processors in a computer, cause the computer to perform the operations required to execute the operations and/or the elements specific to the various aspects of the embodiments of the invention. The computer-readable instructions of a program for performing the operations of the embodiments of the invention may be, for example, the assembly language, or else a source code or an object code written in combination with one or more programming languages.

The invention claimed is:

1. A method for automatically proposing an air conflict resolution, the method comprising a step of:

receiving air conflict data and air situation data, at a time when an air conflict is detected, with a device configured to manage a resolution of air traffic conflicts, the air conflict being detected by an air conflict detection device, and the air conflict comprising at least an air conflict between at least two aircraft or between an aircraft and a given zone, said method further comprising the steps of:

determining with a resolution proposal device a conflict category associated with said detected air conflict based on said air conflict data;

determining with the resolution proposal device a degree of relevance in proposing a resolution to said air conflict according to said conflict category and said air situation data;

triggering a search for a solution with the resolution proposal device when the degree of relevance associated with the air conflict is at least higher than a threshold value;

determining with a resolution search device one or more types of resolution to be applied to resolve said detected air conflict according to said degree of relevance;

determining with the resolution search device a set of alternative trajectories corresponding to said one or more types of resolution;

determining with the resolution search device a set of candidate trajectories from among the set of alternative trajectories, where the resolution search device determines a candidate trajectory as an alternative trajectory which does not generate an air conflict;

selecting with the resolution search device, from among the candidate trajectories, a candidate trajectory which fulfills a selection criterion relating to an operational relevance of the candidate trajectories and to an acceptability of the candidate trajectories by a flight plan management system, the selecting step comprising the sub-steps of:

associating with the resolution search device a degree of operational relevance with each candidate trajectory according to a number of operational relevance criteria, classifying with the resolution search device the candidate trajectories in order of operational relevance as a function of the degrees of relevance associated with said trajectories, and selecting with the resolution search device, from among the candidate trajectories classified in order of operational relevance, a most relevant candidate trajectory which is accepted by the flight plan management system and which allows the resolution of said air conflict without generating other air conflicts;

automatically proposing and returning, with the resolution search device, said candidate trajectory as the resolution to the air conflict for the air conflict; and displaying said candidate trajectory to an air traffic controller on a human machine interface as the resolution to the air conflict, said candidate trajectory being saved and re-evaluated as long as it does not generate an air conflict or has not been accepted by the air traffic controller, wherein the device is configured to be implemented in an air traffic control system that comprises a processing device implemented as a flight data plan system.

2. The method as claimed in claim 1, wherein a type of resolution determined by the resolution search device to automatically propose said candidate trajectory corresponds to one or more conflict resolution actions, a conflict resolution action being chosen from a group comprising a change in trajectory, a change in flight level, and a change in speed.

3. The method as claimed in claim 2, wherein a type of resolution determined by the device to automatically propose said candidate trajectory corresponds to one or more constraints relating to said one or more conflict resolution actions, a constraint being chosen from a group comprising a constraint relating to an orientation and to maximum values for the change of route, a constraint relating to a minimum or maximum flight level value, and a constraint relating to a minimum or maximum speed value.

4. The method as claimed in claim 1, wherein said conflict category determined by the device to automatically propose said candidate trajectory depends on at least one criterion chosen from a group comprising a geometry of said air conflict, a proximity of the air conflict, a criticality of the air conflict, and an evolutionary aspect of flights.

5. The method as claimed in claim 1, wherein the number of criteria utilized by the device to automatically propose said candidate trajectory comprises flight efficiency, flight efficiency being defined by a plurality of criteria comprising fuel consumption, effect on comfort on board an aircraft, fairness between the aircraft involved in the air conflict, and a complexity in implementing and following a proposed solution.

6. The method as claimed in claim 1, wherein said air conflict data utilized by the device to automatically propose said candidate trajectory comprise a geometry of the conflict, a proximity of the conflict, a criticality of the conflict, and an evolutionary aspect of flights.

7. The method as claimed in claim 1, further comprising a step of returning, with the device, flights and zones involved in air conflicts found in relation to those solutions which are more optimal than the solution which was returned and which has not been retained.

8. A device for automatically proposing an air conflict resolution, the device being configured to be implemented in an air traffic control system that comprises a processing device implemented as a flight data plan system, the device being further configured to receive air conflict data and air situation data at a time when an air conflict is detected by an air conflict detection device that detects an air conflict between at least two aircraft or between an aircraft and a given zone, the device comprising:

a resolution proposal device configured to determine a conflict category associated with said detected air conflict based on said air conflict data;

the resolution proposal device further configured to determine a degree of relevance in proposing a resolution to said air conflict according to said conflict category and said air situation data; and the resolution proposal device further configured to trigger a search for a solution when the degree of relevance associated with the air conflict is at least higher than a threshold value;

the device further comprising a resolution search device configured to:

a resolution search device configured to determine one or more types of resolution to be applied to resolve said detected air conflict according to said degree of relevance;

the resolution search device further configured to determine a set of alternative trajectories corresponding to said one or more types of resolution;

the resolution search device further configured to determine a set of candidate trajectories from among the set of alternative trajectories, where the resolution search device determines a candidate trajectory as an alternative trajectory which does not generate an air conflict;

the resolution search device further configured to select, from among the candidate trajectories, a candidate trajectory which fulfills a selection criterion relating to an operational relevance of the candidate trajectories and to an acceptability of the candidate trajectories by a flight plan management system, the resolution search device being further configured to associate a degree of operational relevance with each candidate trajectory according to a number of operational relevance criteria, where: the resolution search device is further configured to classify the candidate trajectories in order of operational relevance as a function of the degrees of relevance associated with said trajectories, and the resolution search device being configured to select, from among the candidate trajectories classified in order of operational relevance, a most relevant candidate trajectory which is accepted by the flight plan management system and which allows the resolution of said air conflict without generating other air conflicts; and the resolution search device being configured to automatically propose and return said candidate trajectory as the resolution to the air conflict for display of said candidate trajectory as the resolution to the air conflict to an air traffic controller on a human machine interface as the resolution to the air conflict, said candidate trajectory being saved and re-evaluated as long as it does not generate an air conflict or has not been accepted by an air traffic controller.

9. The method as claimed in claim 1, further comprising implementing the device and the flight data plan system in the air traffic control system.

10. A flight data plan system comprising the device as claimed in claim 8.

* * * * *